United States Patent [19]
Kai et al.

[11] Patent Number: 5,481,677
[45] Date of Patent: Jan. 2, 1996

[54] DATA TRANSFER SYSTEM IN WHICH DATA IS TRANSFERRED TO OR FROM A DATA MEMORY DURING AN INSTRUCTION FETCH CYCLE

[75] Inventors: Yoshihide Kai, Tokyo; Hiroya Tanigawa, Yokosuka; Toshihiko Wakahara, Yokohama, all of Japan

[73] Assignees: Oki Electric Industry Co., Ltd.; Nippon Telegraph And Telephone Corporation, both of Tokyo, Japan

[21] Appl. No.: 939,044

[22] Filed: Sep. 3, 1992

Related U.S. Application Data

[63] Continuation of Ser. No. 555,349, Jul. 18, 1990.

[30] Foreign Application Priority Data

| Jul. 20, 1989 | [JP] | Japan | 1-185936 |
| Jul. 20, 1989 | [JP] | Japan | 1-185937 |

[51] Int. Cl.⁶ ................................................. G06F 13/00
[52] U.S. Cl. ........................ 395/280; 395/375; 395/846
[58] Field of Search ....................................... 395/325

[56] References Cited

U.S. PATENT DOCUMENTS

| 4,455,620 | 6/1984 | Watanabe | 395/325 |
| 4,847,750 | 7/1989 | Daniel | 395/325 |

*Primary Examiner*—David D. Knepper
*Attorney, Agent, or Firm*—Spencer, Frank & Schneider

[57] ABSTRACT

A data transfer system has an address bus and a data bus, each divided into two parts by a bus switch. A microprocessor and program memory are connected to the first parts of the address and data buses. A data memory, data transfer controller, and input/output devices are connected to the second parts of tile address and data buses. While the microprocessor is fetching an instruction from the program memory, the bus switches disconnect the two parts of the buses, enabling the data transfer controller to transfer data directly between the data memory and input/output devices. At other times the bus switches connect the two parts of the buses, enabling the microprocessor to access the data memory and Input/output devices.

16 Claims, 7 Drawing Sheets

DATA TRANSFER SYSTEM IN WHICH DATA IS TRANSFERRED TO OR FROM A DATA MEMORY DURING AN INSTRUCTION FETCH CYCLE

This application is a Continuation, of application Ser. No. 07/555,349, filed Jul. 18, 1990.

BACKGROUND OF THE INVENTION

This invention relates to a data transfer system, and more particularly to a system for directly transferring data between data memory and input-output devices in an apparatus controlled by a von-Neumann-type microprocessor.

Microprocessors control many types of electronic office equipment, industrial equipment, and household appliances. A microprocessor typically has separate program and data memories, and is connected to various input/output (I/O) devices such as sensors, indicators, and external memory devices.

Most microprocessors are of the von-Neumann type, which fetch and execute Instructions from program memory sequentially, one at a time. The instructions direct the microprocessor to carry out arithmetic and logic operations and perform data transfers. A common processing pattern is to transfer data from I/O devices into data memory, perform operations on the data, then transfer the results from data memory to I/O devices. The transfers take place on a set of buses, controlled by the microprocessor, over which the microprocessor, program memory, data memory, and I/O devices are interconnected.

One prior-art method of transferring data between I/O devices and data memory uses the microprocessor as an intermediary. To transfer data from an I/O device to data memory, for example, the microprocessor first reads the data from the I/O device into an internal register, then writes the data from the internal register to data memory. Transfers in the reverse direction are carried out similarly.

A disadvantage of this method is that it requires two instructions, one to effect the transfer between the microprocessor and the I/O device, and another to effect the transfer between the microprocessor and data memory. Besides making programs unnecessarily long, the use of two instructions risks the occurrence of an interrupt between the instructions. If an interrupt occurs, an interrupt-handling routine will be executed between the two parts of the data transfer, causing a considerable delay. In a transfer of data from a sensor device to data memory, for example, the delay can mean that by the the the sensor data is stored in data memory for processing, it no longer reflects the current condition sensed by the sensor.

Another method of transferring data between an I/O device and data memory is known as direct memory access (DMA). This method is frequently used for transferring large quantities of data between data memory and an external memory device. In a DMA transfer, the microprocessor notifies a DMA controller (DMAC) of the addresses between which the transfer is to take place and the quantity of data to be transferred, then gives control of the buses to the DMAC. The DMAC transfers the data between the I/O device and data memory directly, without intermediate storage in a register.

A problem with this method is that during the DMA transfer, since the microprocessor does not have control of the buses, It cannot communicate with the data memory or I/O devices, or even fetch Instructions from program memory. The microprocessor must therefore halt until the DMA transfer is completed, which is obviously an inefficient method of operation.

SUMMARY OF THE INVENTION

An object of the present invention is accordingly to transfer data directly between I/O devices and data memory without halting the microprocessor.

A data transfer system comprises an address bus having a first part and a second part for transferring address information, a data bus having a first part and a second part for transferring data, and a control bus for transferring control signals. A yon-Neumann-type microprocessor is connected to the control bus and the first parts of the address bus and data bus. A program memory, likewise connected to the control bus and the first parts of the address bus and data bus, stores instructions to be executed by the microprocessor. A data memory connected to the control bus and the second parts of the address bus and data bus stores data. One or more I/O devices are also connected to the control bus and the second part of the data bus.

An address bus switch disconnects the two parts of the address bus when the microprocessor is fetching an instruction from the program memory, and connects them at other times. A data bus switch disconnects the two parts of the data bus when the microprocessor is retching an instruction from the program memory, and connects them at other times. A data transfer controller connected to the control bus and the second part of the address bus generates addresses and control signals to perform direct transfers of data between the data memory and I/O devices via the second part of the data bus while the microprocessor is fetching instructions from the program memory.

BRIEF DESCRIPTION OF THE DRAWINGS

FIG. 1(A-B) is a block diagram illustrating a novel data transfer system.

FIG. 3(A-G) is a timing diagram illustrating the operation of the data transfer system in FIG. 1.

FIG. 4(A-B) is a block diagram Illustrating another novel data transfer system.

FIG. 5(A-K) is a timing diagram illustrating the operation of the data transfer system in FIG. 4.

DETAILED DESCRIPTION OF THE INVENTION

Figures 1, 1A:
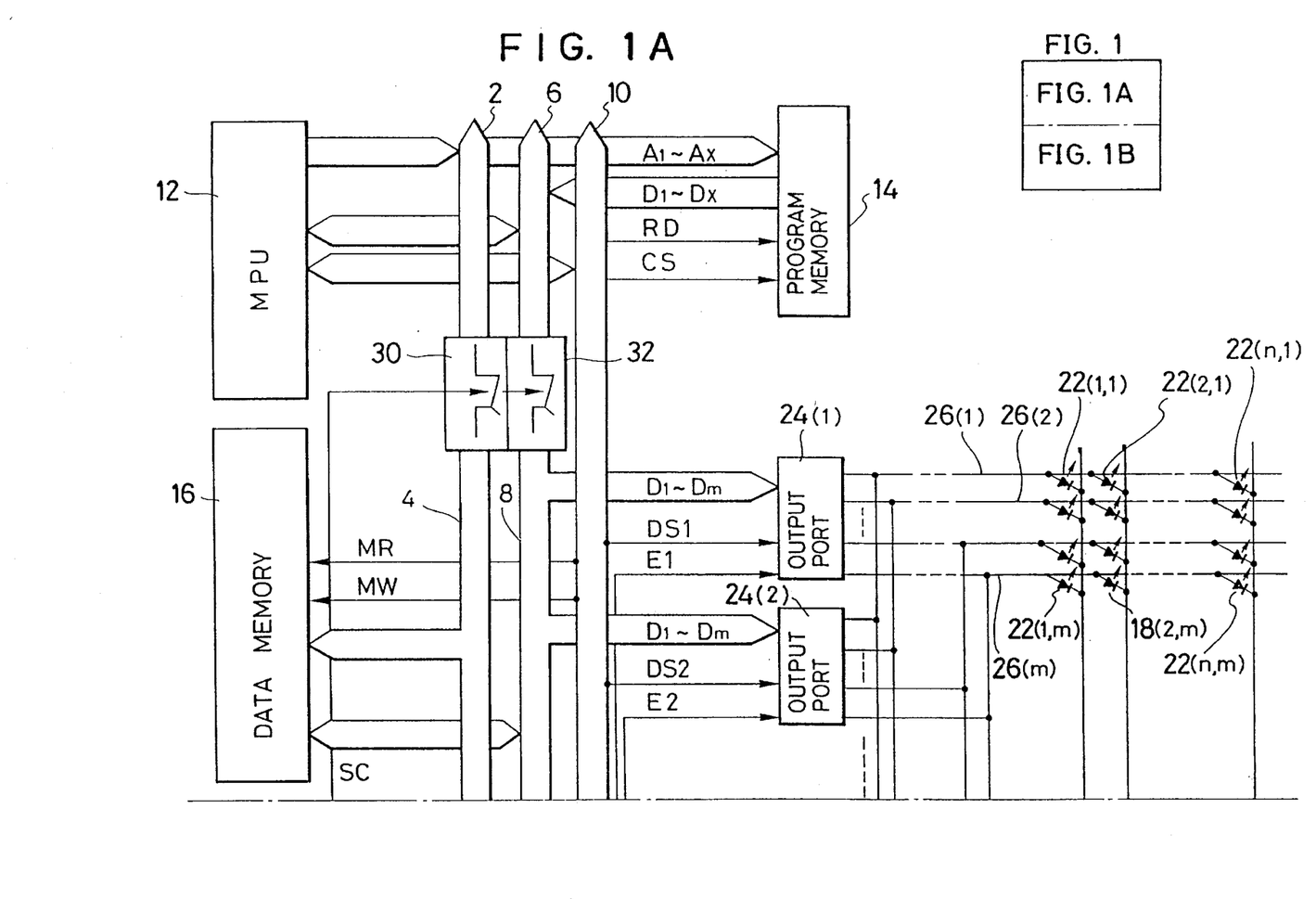
Figure 1B:
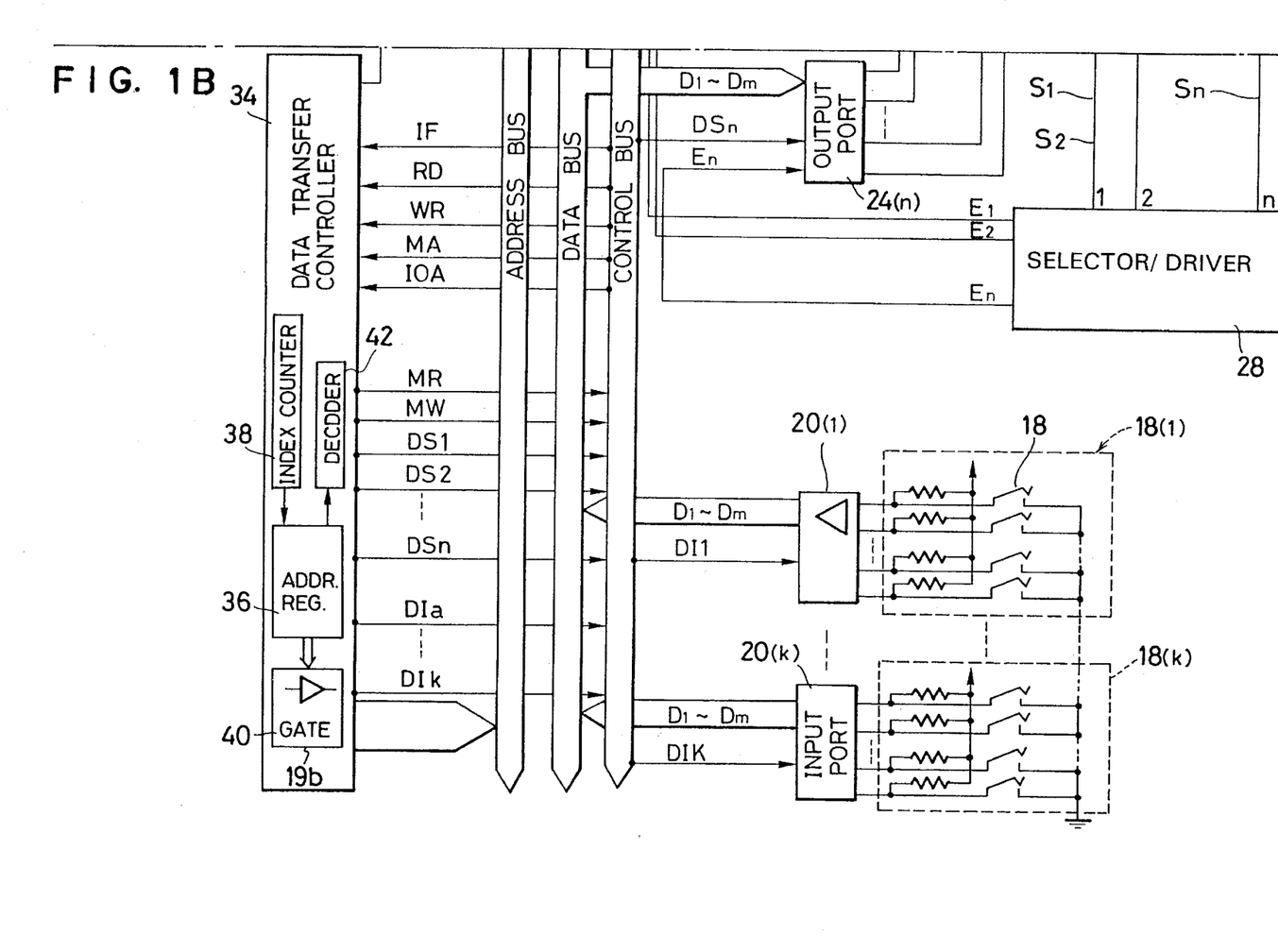
Figure 2:
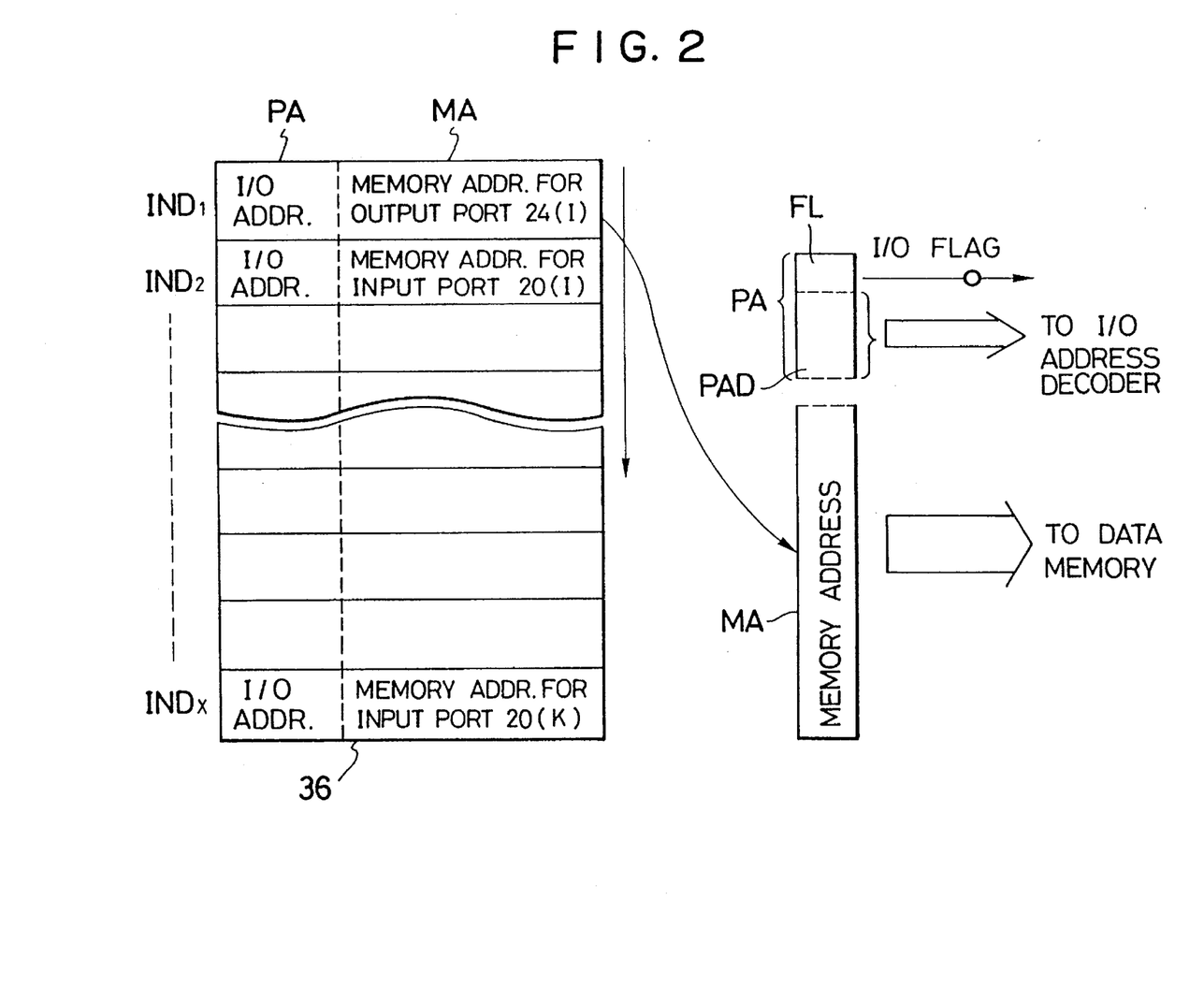
FIG. 2 is a diagram of the address register in the data transfer controller In FIG. 1.
Figure 3:
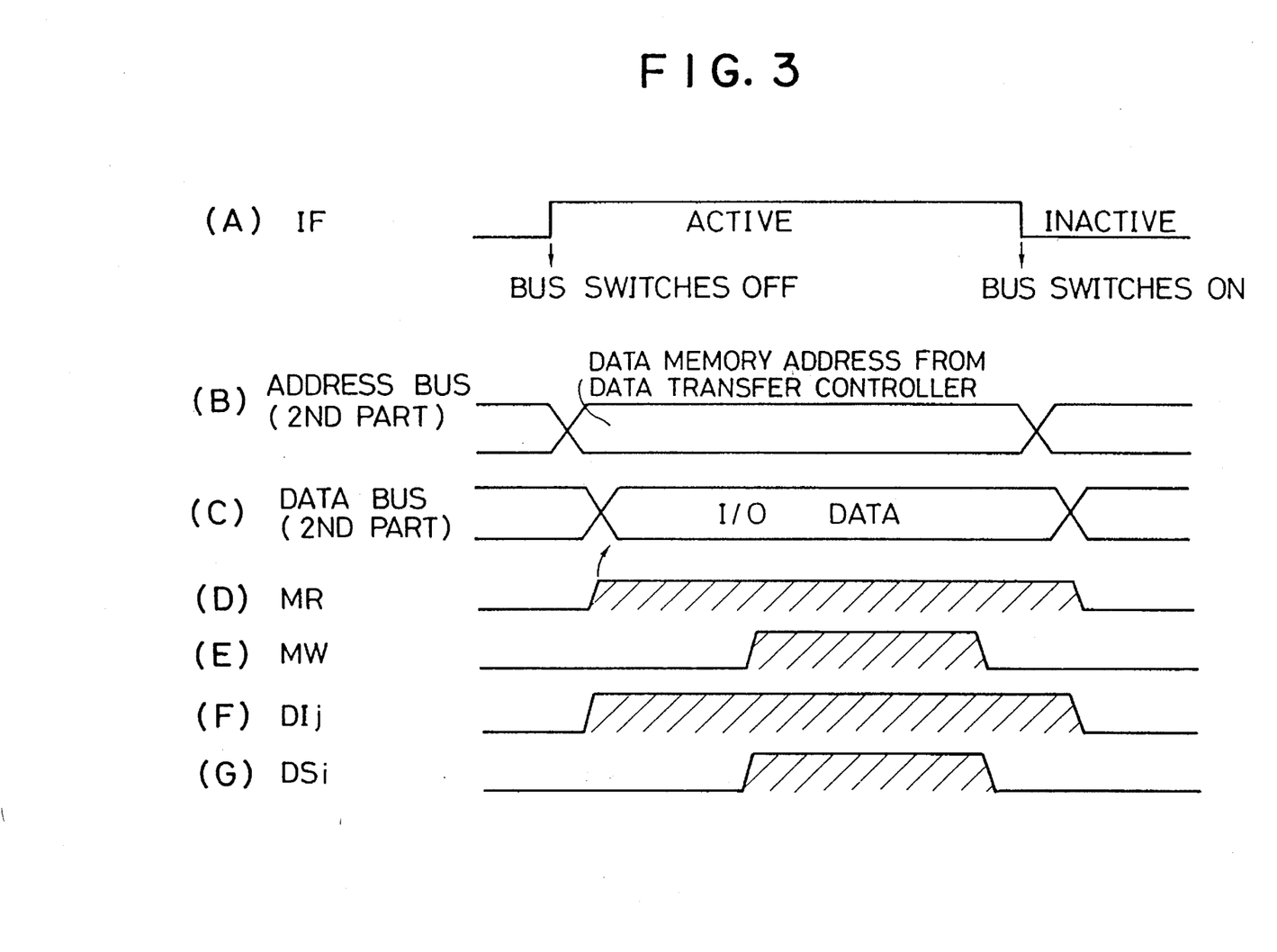
Figure 4A:
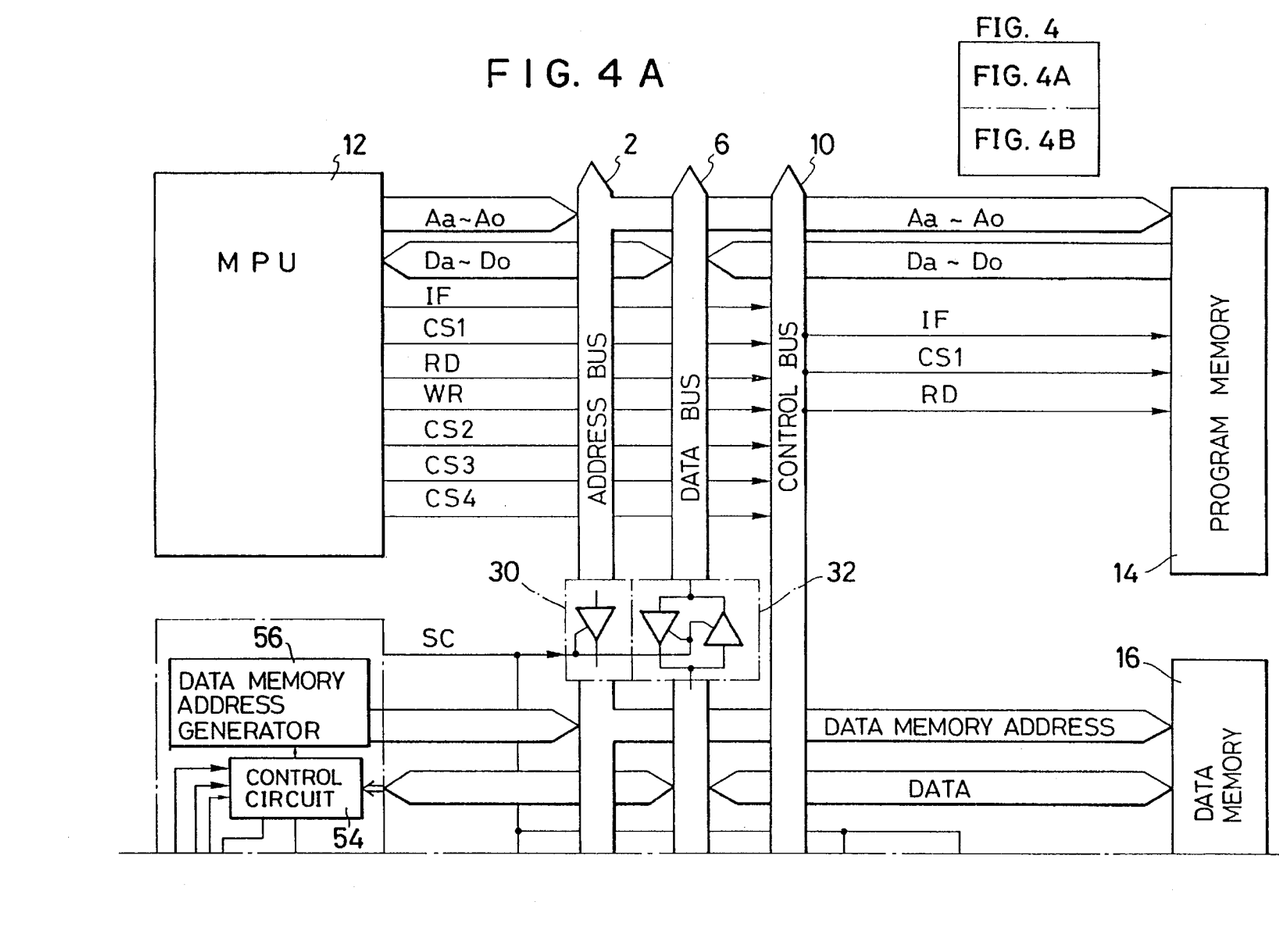
Figure 5:
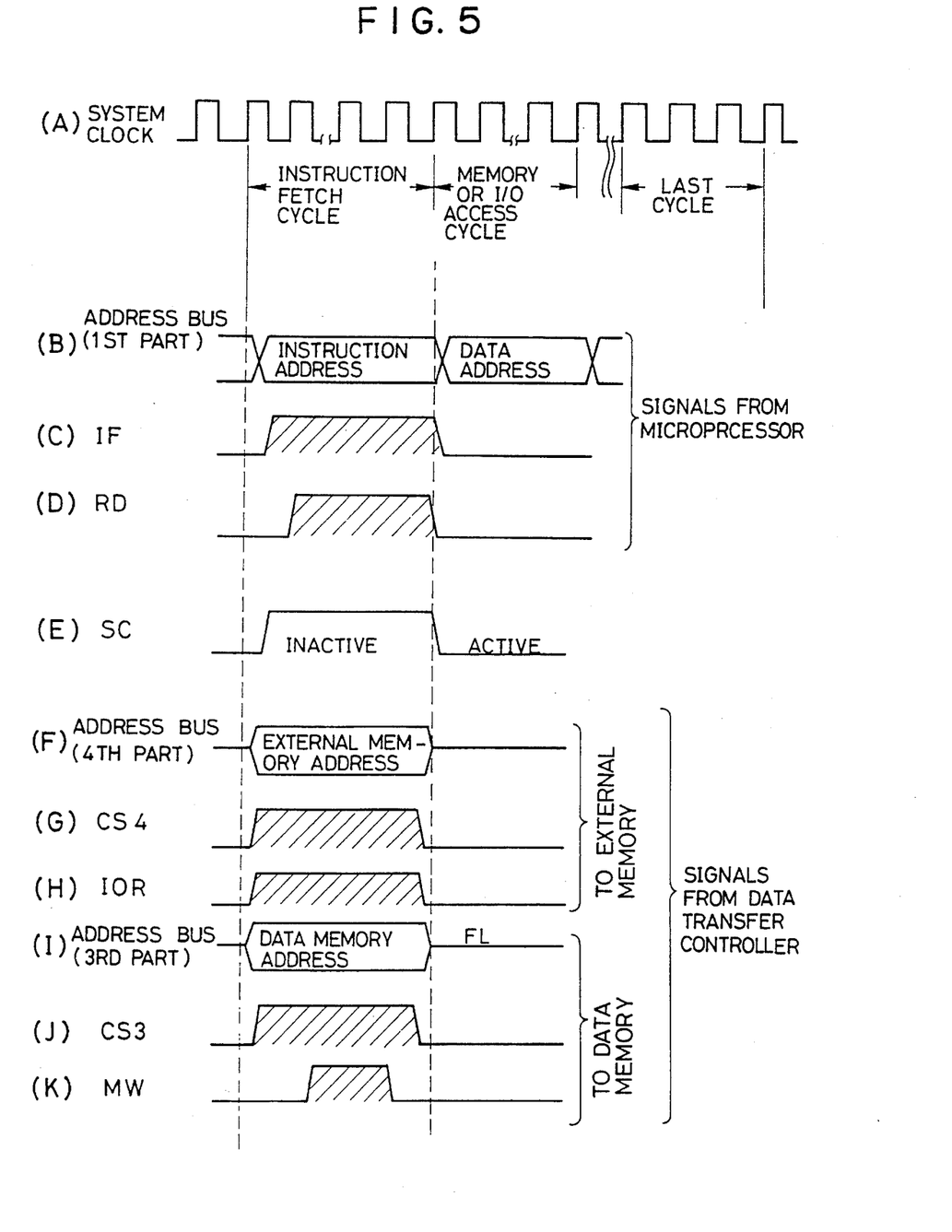

Two novel data transfer systems embodying the present invention will be described. The first, illustrated in FIGS. 1 to 3, is particularly suited to systems requiring regular input of sensor information and output of control information. The second, illustrated in FIGS. 4 and 5, is particularly suited to the transfer of Information between an internal data memory and an external memory device.

With reference to FIG. 1, the first novel data transfer system comprises an address bus having a first part 2 and a second part 4 for transmitting address information, a data bus having a first part 6 and a second part 8 for transmitting data, and a control bus 10 for transmitting control signals. All these buses comprise pluralities of signal lines. For example, the first part 6 and second part 8 of the data bus each comprise m data signal lines, enabling them to carry m bits of information $D_1$ to $D_m$, the number m normally being a power of two such as eight or sixteen.

A von-Neumann-type microprocessor 12 is connected to the first part 2 of the address bus, the first part 6 of the data bus, and the control bus 10. A program memory 14, also connected to the first part 2 of the address bus, the first part 6 of the data bus, and the control bus 10, stores instructions to be executed by the microprocessor 12. A data memory 16, connected to the second part 4 of the address bus, the second part 8 of the data bus, and the control bus 10, stores data operated on by the microprocessor 12.

Among the signals sent by the microprocessor 12 to the control bus 10 are an Instruction Fetch (IF) signal, a Read (RD) signal, a Write (WR) signal, a Memory Access (MA) signal, an I/O Access (IOA) signal, and a Chip Select (CS) signal. The microprocessor 12 activates IF and CS when fetching an instruction from the program memory 14. The functions of the other signals will be explained later.

A plurality of input and output devices are connected to the control bus 10 and the second part 8 of the data bus.

The input devices, shown schematically as sensor switches 18 in FIG. 1, comprise groups 18(1) to 18(k) of m sensor switches which are connected to the second part 8 of the data bus via respective m-bit input ports 20(1) to 20(k). Each of the input ports 20(i) comprises three-state buffer circuits that transfer m bits of data from the i-th group of sensors 18(1) to the second part 8 of the data bus when a Data In (DIi) signal is received from the control bus 10.

The output devices, shown schematically as light-emitting diodes (LEDs) 22(1, 1) to 22(n, m), comprise n groups of m LEDs which are connected to the second part 8 of the data bus via m-bit output ports 24(1) to 24(n). The i-th output port 24(1) comprises latch circuits that latch the data on the second part 8 of the data bus when a Data Set signal (DS1) is received from the control bus 10, and output the latched data to the LEDs 22 when an Enable signal (Ei) is received.

The output ports 24 are connected to the LEDs 22 by output lines 26(1) to 26(m), the LEDs 22(1, J) to 22(n, J) all being connected to the same output line 26(J). Each output port 24 is connected to all the output lines 26(1) to 26(m). To enable the LEDs 22(1, J) to 22(n, 3) connected to time same output line 26(3) to be driven individually, the LEDs 22 and output ports 24 are also connected to a 1/n-duty selector/driver circuit 28 having n select lines S1 to Sn and n enable lines E1 to En. The i-th select line Si is connected to the LEDs 22(1, 1) to 22(1, m). The i-th enable line Ei is connected to the output port 24(i), providing the Enable signal Ei mentioned above.

The 1/n-duty selector/driver circuit 28 selects successive groups of LEDs 22 by supplying power on successive select lines S1 with a duty cycle of 1/n. When driving the i-th select line Si, the 1/n-duty selector/driver circuit 28 also sends an Enable signal on the i-th enable line Ei to the i-th output port 24(i). The result is that the LEDs 22(1, 1) to 22(1, m) display the data latched in the output port 24(1). The 1/n-duty selector/driver circuit 28 selects the groups of LEDs 22 cyclically at a high rate of speed; in effect the LEDs 22 are driven by alternating current with a duty cycle of 1/n.

The first and second parts 2 and 4 of the address bus are Interconnected by an address bus switch 30. The first and second parts 6 and 8 of the data bus are interconnected by a data bus switch 32. The address bus switch 30 and the data bus switch 32 are both controlled by a Switch Control signal (SC): when SC is active, the two parts of the address bus are mutually Interconnected, and the two parts of the data bus are mutually interconnected; when SC is inactive, the two parts of the address and data buses are disconnected.

The SC signal Is output from a data transfer controller 34 that is connected to the second part 4 of the address bus and the control bus 10. The data transfer controller 34 generates SC from the IF signal, which It receives from the microprocessor 12 via the control bus 10. The data transfer controller 34 also generates addresses and control signals for transferring sensor data from the Input ports 20 to the data memory 16, and transferring data from the data memory 16 to the output ports 24. These addresses and control signals are generated as follows.

The data transfer controller 34 has an address register 36 that stores pairs of addresses, each pair comprising a data memory address and an I/O address. An index counter 38 indicates successive pairs of addresses in the address register 36. The index counter 38 may be, for example, a modulo-(n+k) counter that counts cyclically from 0 to n+k−1, incrementing once each time the IF signal becomes active. A gate circuit 40 provides the data memory address indicated by the index counter 38 to the second part of the address bus 8 while the IF signal is active. An I/O address decoder 42 decodes the I/O address Indicated by the index counter 38 and generates Data In and Data Set signals to select the input ports 20 and output ports 24, thus selecting groups of I/O devices.

The data transfer controller 34 also receives Read (RD), Write (WR), Memory Access (MA), and I/O Access (IOA) signals From the microprocessor 12 via the control bus 10, and sends Memory Read (MR) and Memory Write (MW) signals to the control bus 10. The functions of these signals will be described later.

FIG. 2 shows the address register 36 in more detail. Entries in the address register 36 are Indicated by index numbers $IND_1$ to $IND_x$ generated by the index counter 38 in the cyclic sequence $IND_1, IND_2 \ldots IND_x, IND_1 \ldots$ Each entry comprises a PA field containing an I/O address and an MA field containing a corresponding data memory address. The I/O address is divided into a port address (PAD) and a flag (FL) indicating whether the port is an input port or an output port. For example, the entry indicated by $IND_1$ contains an I/O address designating output port 24(1) and a corresponding data memory address, with a flag value FL designating this port as an output port.

Each input port 20 or output port 24 thus corresponds to a fixed data memory address in the data memory 16. The microprocessor 12 receives data from an Input port 20 by reading the corresponding data memory address, and sends data to an output port 24 by writing the data at the corresponding data memory address.

Next the operation of the data transfer system in FIG. 1 will be explained. First the operation when the microprocessor 12 is fetching an instruction will be explained with reference to FIG. 3; then the operation when the microprocessor 12 is not fetching an instruction will be explained.

When the microprocessor 12 fetches an instruction from the program memory 14, It activates the IF signal as shown at (A) in FIG. 3. The IF signal is received by the data transfer controller 34, which deactivates the Switch Control (SC), causing the address bus switch 30 and the data bus switch 32 to switch off, thus disconnecting the first part 2 from the second part 4 of the address bus and the first part 6 from the second part 8 of the data bus. The microprocessor 12 proceeds to access the program memory 14 via the first part 2 of the address bus and the first part 6 of the data bus. Specifically, it activates the CS signal to select the program memory 14, places the address of the next instruction on the first part 2 off the address bus, activates the RD signal, and receives the instruction via the first part 6 of the data bus.

When the IF signal Is activated, the index counter 38 in the data transfer controller 32 Is Incremented to select the next entry In the address register 36. The gate circuit 40 then switches on, causing the memory address stored in this entry to be placed on the second part 4 of the address bus as shown at (B) in FIG. 3.

If the flag bit (FL) in this entry indicates that the selected port is an input port, after a suitable setup time the data transfer controller 34 activates the Memory Write signal (MW) as shown at (E) in FIG. 3. In the meantime, the I/O address decoder 42 decodes the I/O address in the address register 36 to a Data In signal DIJ, which is sent to the input port 20(J) via the control bus 10 as shown at (F) in FIG. 3. The input port 20(J) responds by placing its data on the second part 8 of the data bus as shown at (C) in FIG. 3. When MW is activated, the data memory 16 stores this data at the address indicated on the second part 4 of the address bus.

If the flag bit (FL) indicates that the port is an output port, after a slight delay to allow the data bus switch 32 to turn off, the data transfer controller 34 activates the Memory Read signal (MR) as shown at (D) In FIG. 3, causing the data memory 16 to place the data stored at the address indicated by the second part 4 of the address bus on the second part 8 of the data bus as shown at (C) in FIG. 3. The I/O address decoder 42 decodes the I/O address in the address register 36 to a Data Set signal DSi, which is sent to the output port 24(i) after a suitable setup time as shown at (G) In FIG. 3, causing the output port 24(1) to latch the data on the second part 8 of the data bus. The data latched in the output port 241 then controls the i-th group of LEDs 22(1, 1) to 22(1, m) as already explained.

When the microprocessor 12 finishes fetching the instruction, it deactivates the IF signal as shown at (A) in FIG. 3, causing the gate circuit 40 to switch off and the address bus switch 30 and the data bus switch 32 to switch on. The CS signal is also deactivated. The microprocessor 12 now has control of both parts of the address bus and data bus, and can access the data memory 16.

To read the data memory 16, the microprocessor 12 activates the MA and RD signal and places a data memory address on the first part 2 of the address bus. The address is transmitted through the address bus switch 30 to the second part 4 of the address bus and received by the data memory 16. The MA and RD signals cause the data transfer controller 34 to generate an MR signal which is also received by the data memory 16. The data memory 16 then places the data at the specified address on the second part 8 of the data bus, from which the microprocessor 12 receives the data via the data bus switch 32 and the first part 6 of the data bus.

To write data in the data memory 16, the microprocessor 12 activates the MA and WR signals, places a data memory address on the first part 2 of the address bus, and places the data to be written on the first part 6 of the data bus. The address and data are transmitted through the address bus switch 30 and the data bus switch 32 to the second part 4 of the address bus and the second part 8 of the data bus. The MA and WR signals cause the data transfer controller 34 to generate an MW signal, commanding the data memory 16 to store the data at the indicated address.

The microprocessor 12 can also read data directly from an input port 20 or write data directly to an output port 24 by activating the I/O Access (IOA) signal. This signal may be, for example, a multiple-bit signal designating the index number of the port to be accessed. The data transfer controller 34 decodes the corresponding entry in the address register 36 and generates the necessary Data In or Data Set signal.

A major advantage of the data transfer system in FIG. 1 is that transfers between data memory and input or output ports are not delayed by interrupts. During execution of an interrupt-handling routine, the data transfer controller 34 continues to transfer input or output data at every instruction fetch. The microprocessor 12 can always read the most recent sensor data from the data memory 16, and LED output data written In the data memory 16 is always transferred promptly to the output ports 24.

Another advantage Is that overall system operation 1s more efficient than In the prior art, because data transfers and instruction fetches are carried out at the same time. Still another advantage is that there are fewer program steps, so less program memory is required.

An advantage of the scheme shown In FIG. 1 whereby all output ports 24 share the same output lines 26(1) to 26(m) is that the printed circuit board on which the microprocessor 12 and the output ports 24 are mounted requires few external connectors, and can therefore be easily installed In the apparatus to be controlled.

Next another novel data transfer system will be described with reference to FIG. 4. Reference numerals and signal names In FIG. 4 identical to those in FIG. 1 denote identical or equivalent elements or signals, descriptions of which will be omitted. The signal denoted CS in FIG. 1 that selects the program memory 14 is denoted CS1 in FIG. 4.

The data transfer system in FIG. 4 has, In addition to the address bus switch 30, a secondary address bus switch 44 dividing the second part of the address bus into a third part 46 and a fourth part 48. The address bus switch 30 in FIG. 4 is a three-state buffer circuit; the data bus switch 32 is a bi-directional three-state buffer circuit; the secondary address bus switch 44 is a simple bus switch. The address bus switch 30, the data bus switch 32, and the secondary address bus switch 44 are all switched on and off simultaneously by the SC signal.

The input/output device to be accessed in FIG. 4 is an external memory 50 such as a disk memory device, which is connected directly to the fourth part 48 of the address bus and the second part 8 of the data bus.

The data transfer controller 52 In FIG. 4 differs from the data transfer controller 34 in FIG. 1 in its Internal structure and In the signals It receives from the microprocessor 12 via the control bus 10. The data transfer controller 52 comprises a control circuit 54, a data memory address generator 56, a data memory timing generator 58, an I/O address generator 60, and an I/O timing generator 62. From the control bus 10, the data transfer controller 52 receives the IF, RD, and WR signals described in FIG. 1, and a Chip Select signal CS2.

The control circuit 54 is connected to the second part 8 of the data bus and the control bus 10, via which buses it receives information from the microprocessor 12 indicating addresses in the data memory 16 and the external memory 50 between which data is to be transferred, whether these addresses should be incremented or decremented, the amount of data to be transferred, and the direction of the transfer. The control circuit 54 Initializes and controls the other circuits in the data transfer controller 52 according to this information.

After the control circuit 54 sets an Initial address in the data memory address generator 56, the data memory address generator 56 proceeds to generate an increasing or decreasing sequence of data memory addresses which it sends to the third part 46 of the address bus, thence to the data memory 16. At the same time, the data memory timing generator 58 generates Chip Select (CS3) and Memory Read (MR) or Memory Write (MW) signals, causing the data memory 16 to read out or store data at the specified addresses.

Similarly, after the control circuit 54 sets an initial address in the I/O address generator 60, the I/O address generator 60 proceeds to generate an Increasing or decreasing sequence of external memory addresses which it sends to the fourth part 48 of the address bus, thence to the external memory 50. At the same time, the I/O timing generator 62 generates Chip Select (CS4) and I/O Read (IOR) or I/O Write (IOW) signals, causing the external memory 50 to read out or store data at the specified addresses.

A set of six signal switches 64 enables the data memory 16 and the external memory 50 to receive the MR, MW, CS3, IOR, IOW, and CS4 signals from the data memory timing generator 58 and the I/O timing generator 62 as described above, or from the microprocessor 12 via the control bus 10. These signal switches 64 are also controlled by the Switch Control signal (SC). When the SC signal is active, turning on the address bus switch 30, the data bus switch 32, and the secondary address bus switch 44 to interconnect the different parts of the address and data buses, SC also sets the signal switches 64 to the A side In FIG. 1, so that the MR, MW, CS3, IOR, IOW, and CS4 signals are received from the control bus 10. In this case MR and IOR are both connected to the microprocessor's RD signal, and MW and IOW are both connected to the microprocessor's WR signal. When SC is inactive, the signal switches 64 are set to the B side so that MR, MW, CS3, IOR, IOW, and CS4 are received from data memory timing generator 58 and the I/O timing generator 62.

Next the transfer of data from the external memory 50 to the data memory 16 by direct memory access (DMA) will be described with reference to FIG. 5.

When a DMA transfer from the external memory 50 to the data memory 16 becomes necessary, the microprocessor 12 activates the CS2 signal to select the data transfer controller 52, activates the WR signal to indicate the transfer direction, sends other information describing the transfer to the control circuit 54 via the first and second parts 6 and 8 of the data bus, and sets a DMA request flag in the control circuit 54, placing the data transfer controller 52 in DMA mode. The microprocessor 12 then continues executing its program.

As indicated at (A) in FIG. 5, program execution in the microprocessor 12 is driven by a system clock signal and is divided into machine cycles comprising a plurality of system clock cycles. Execution of all Instruction begins with an instruction fetch cycle In which the instruction is fetched from the program memory 14. During this cycle the microprocessor 12 places the address at which the instruction is stored on the first part 2 of the address bus as Indicated at (B), and activates the IF signal as indicated at (C). Although not shown in the drawing, the microprocessor 12 also activates the CS1 signal to select the program memory 14. Next the microprocessor 12 activates the RD signal as shown at (D) in FIG. 5, causing the program memory 14 to place the instruction code on the first part 6 of the data bus, from which it is received by microprocessor 12.

While IF is active, the data transfer controller 52 deactivates the SC signal as shown at (E) in FIG. 5, disconnecting the different parts of the address bus and data bus and setting the signal switches 64 to the B side. During the instruction fetch cycle, the microprocessor 12 and the data transfer controller 52 operate independently: the microprocessor 12 controls the program memory 14; the data transfer controller 52 controls the data memory 16 and the external memory 50, which are isolated from the microprocessor 12.

The instruction fetch cycle may be followed by one or more memory or I/O access cycles. During these cycles the IF signal is inactive and the SC signal becomes active, connecting the different parts of the address bus and data bus and setting the signal switches 64 to the A side. The microprocessor 12 therefore has control of the data memory 16, the external memory 50, and the entire data and address buses, and can read or write operand data in the data memory 16 or external memory 50 as specified by the Instruction fetched in the instruction fetch cycle. Specifically, the microprocessor 12 places a data memory address or external memory address on the address bus, activates CS3 or CS4 to select the data memory 16 or the external memory 50, and activates RD or WR to designate read or write access.

Each time the IF signal as activated, the I/O address generator 60 outputs an external memory address on the fourth part 48 of the address bus as Indicated at (F) in FIG. 5 and the I/O timing generator 62 activates the CS4 and IOR signals as indicated at (G) and (II), causing the external memory 50 to place the data stored at the specified external memory address on the second part 8 of the data bus. In addition, the data memory address generator 56 outputs a data memory address on the third part 46 of the address bus as Indicated at (I) In FIG. 5. The data memory timing generator 58 activates CS3 as indicated at (J) then, after a suitable setup time, activates MW as indicated at (K), causing the data memory 16 to store the data on the second part 8 of the data bus at the specified data memory address. In this way the data is transferred directly from the external memory 50 to the data memory 16 while the microprocessor 12 is fetching an instruction.

At the end of the Instruction fetch cycle, the data transfer controller 52 places Its the address output lines In the high-impedance state, so that addresses output by the data memory address generator 56 and the I/O address generator 60 will not collide with addresses output by the microprocessor 12 during memory or I/O access cycles. The data transfer controller 52 also updates (Increments or decrements) the data memory address In the data memory address generator 56 and the external memory address in the I/O address generator 60, and decrements a value in the control circuit 54 indicating the remaining quantity of data to be transferred. In the next instruction fetch cycle, the data transfer controller 52 performs another transfer from the external memory 50 to the data memory 16, using the updated addresses.

When the entire DMA transfer is completed, (when the remaining quantity of data to be transferred is zero), the data transfer controller 52 resets the DMA request flag and exits DMA mode. The microprocessor 12 can determine that the DMA transfer is finished by reading the DMA request flag. Alternatively, the data transfer controller 52 can generate an interrupt to notify the microprocessor 12 that the transfer is completed.

DMA transfers from the data memory 16 to the external memory 50 are carried out in essentially the same way, the data transfer controller 52 generating MR and IOW signals Instead of MW and IOR. A detailed description will be omitted.

Since the microprocessor 12 does not have to halt while the DMA transfer is being performed, overall efficiency is higher than in systems using prior-art DMA controllers, and much higher than in prior-art systems performing the transfer through the microprocessor 12.

Figure 4B:
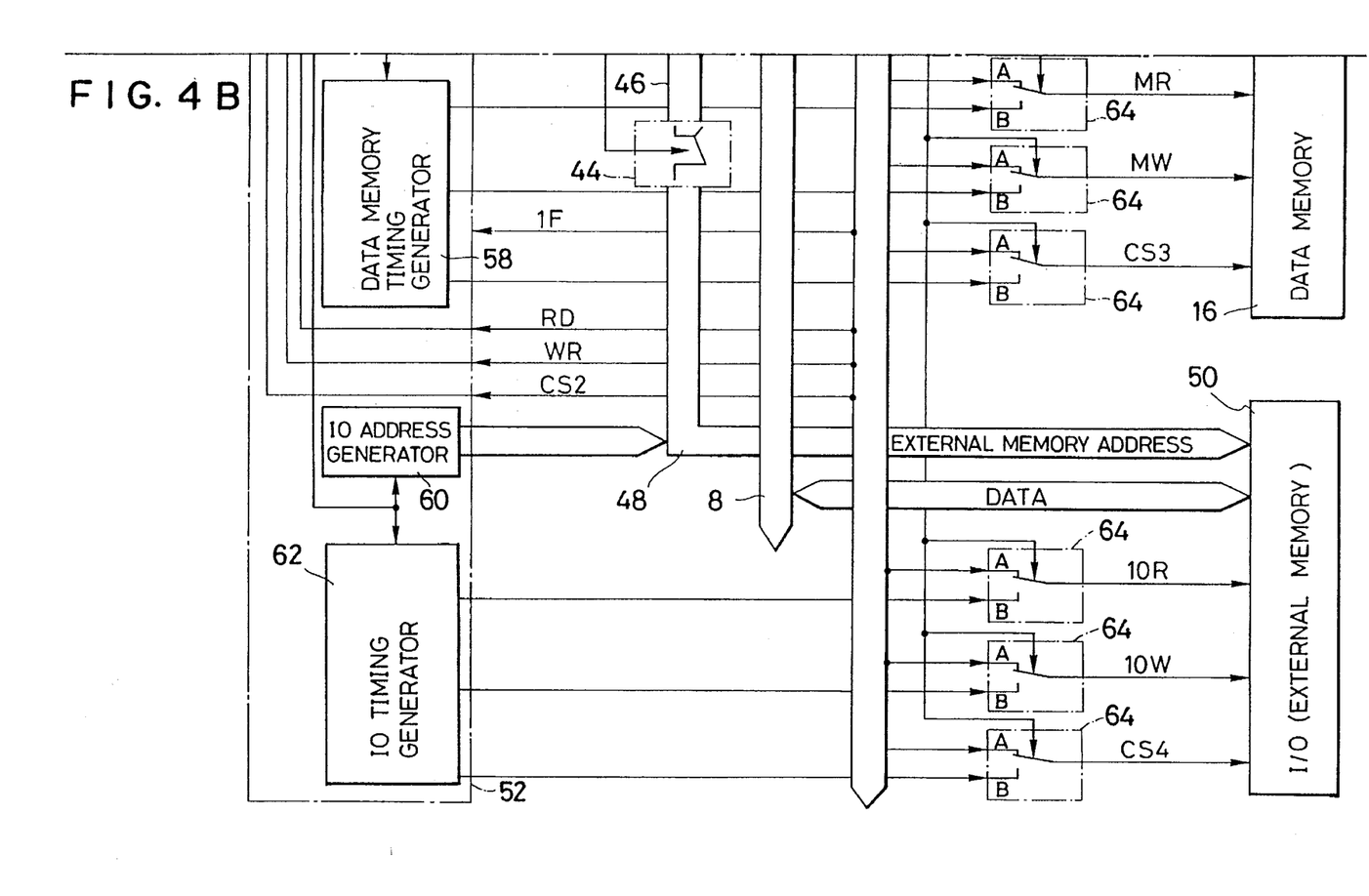

The scope of this invention is not restricted to the structures shown in the drawings but includes many modifications that will be apparent to one skilled in the art, including but not limited to the following: the I/O devices are not limited to sensors, LEDs, and external memory devices but may be any input, output, or input/output devices; the Instruction Fetch (IF) signal may be used directly as the Switch Control (SC) signal, instead of having the data transfer controller generate SC from IF; the data transfer controller may be structured so as to perform more than one data transfer per instruction fetch cycle; in the novel data transfer system in FIG. 1, the input and output ports need not be m-bit ports, but may comprise arbitrary numbers of bits equal to or less than m; in the novel data transfer system In FIG. 4, the DMA transfer may be requested by the external memory device or another external device instead of by the microprocessor; also in this data transfer system, In addition to the DMA mode described, the data transfer controller may have a burst DMA mode In which it performs a continuous DMA transfer while the microprocessor halts. The burst DMA mode would be useful when the microprocessor must wait until the DMA transfer is completed before continuing its program. User-coded software could select either the burst DMA mode or the DMA mode described above depending on the amount of data to be transferred and the desired transfer speed; provision of both modes would be extremely convenient to the programmer.

What is claimed is:

1. A data transfer system, comprising:

an address bus means, having a first part and a second part, for transferring address information;

a data bus means, having a first part and a second part, for transferring data;

a control bus means for transferring control signals;

a yon-Neumann-type microprocessor connected to said first part of said address bus means, said first part of said data bus means, and said control bus means;

a program memory means, connected to said first part of said address bus means, said first part of said data bus means, and said control bus means, for storing instructions to be executed by said microprocessor during instruction cycles;

a data memory means, connected to said second part of said address bus means, said second part of said data bus means, and said control bus means, for storing data;

at least one I/O device connected to said second part of said data bus means and said control bus means;

an address bus switch means for disconnecting said first part of said address bus means from said second part of said address bus means when said microprocessor is fetching an instruction from said program memory means, and connecting said first part of said address bus means to said second part of said address bus means at other times in each instruction cycle;

a data bus switch means for disconnecting said first part of said data bus means from said second part of said data bus means when said microprocessor is fetching an instruction from said program memory means, and connecting said first part of said data bus means to said second part of said data bus means at said other times; and data transfer controller means, connected to said second part of said address bus means and said control bus means, for generating addresses and control signals to perform direct transfers of data between said data memory means and said at least one I/O device via said second part of said data bus means while said microprocessor is fetching instructions from said program memory means.

2. The system of claim 1, wherein said other times includes times when said microprocessor is executing instructions.

3. The system of claim 1, wherein:

said microprocessor executes a program during a sequence of instructions cycles, each instruction cycle including an instruction fetch portion and an instruction executing portion;

said address bus switch means disconnects said first part of said address bus means from said second part of said address bus means during said instruction fetch portion of an instruction cycle; and said data bus switch means disconnects said first part of said data bus means from said second part of said data bus means during said instruction fetch portion of an instruction cycle.

4. The system of claim 3, wherein said instruction executing portion of an instruction cycle may be employed by said microprocessor for accessing said data memory means or said at least one I/O device.

5. The system of claim 1, wherein said second part of said address bus means comprises a third part to which said data memory means is connected, and a fourth part to which said at least one I/O device is connected, and further comprising a secondary address bus switch means for connecting and disconnecting said third part and said fourth part, said secondary address bus switch means being switched on and off simultaneously with said address bus switch means.

6. The system of claim 5, wherein said data transfer controller means comprises:

a data memory address generator means for supplying data memory addresses to said third part of said address bus means when said secondary address bus switch means is switched off;

a data memory timing generator means for sending control signals to said data memory means;

an I/O address generator means for supplying I/O addresses to said fourth part of said address bus means;

an I/O timing generator means for sending control signals to said at least one I/O device; and a control circuit means, connected to said control bus means, said second part of said data bus means, said data memory address generator means, said data memory timing generator means, said I/O address generator means, and said I/O timing generator means, for initializing said data memory address generator means, said data memory timing generator means, said I/O address generator means, and said I/O timing generator means according to information received from said microprocessor via said data bus means.

7. The system of claim 6, further comprising control signal switches, switched simultaneously with said address bus switch means and data bus switch means, for selecting either control signals received from said microprocessor via said control bus means or control signals received directly from said data memory timing generator means and said I/O timing generator means and providing the signals thus selected to said data memory means and said at least one I/O device.

8. The system of claim 1, wherein said microprocessor sends said data transfer controller means an Instruction Fetch signal that Is active when said microprocessor is fetching an instruction from said program memory means and inactive at other times.

9. The system of claim 8, wherein said data transfer controller means is responsive to said Instruction Fetch signal for controlling said address bus switch means and said data bus switch means.

10. The system of claim 9, wherein said data bus transfer controller means causes said address bus switch means to disconnect said first part of said address bus means from said second part of said address bus means and causes said data bus switch means to disconnect said first part of said data bus means from said second part of said data bus means when said Instruction Fetch signal is active, and causes said address bus switch means to connect said first part of said address bus means to said second part of said address bus means and causes said data bus switch means to connect said first part of said data bus means to said second part of said data bus means when said Instruction Fetch signal is inactive.

11. The system of claim 10, wherein when said microprocessor activates said Instruction Fetch signal when it begins fetching an instruction, and deactivates said Instruction Fetch signal when it finishes fetching the instruction.

12. The system of claim 8, wherein said data transfer controller means comprises:
   an address register means for storing pairs of addresses, each comprising a data memory address and an I/O address;
   an index counter means for cyclically indicating successive pairs of addresses in said address register means;
   a gate circuit means for providing the data memory address indicated by said index counter means to said second part of said address bus means while said microprocessor is fetching an instruction from said program memory means; and
   an I/O address decoder means for decoding the I/O address indicated by said index counter means and generating control signals to select said at least one I/O device.

13. The system of claim 12, wherein said index counter means increments once each time said microprocessor fetches an instruction from said program memory means.

14. The system of claim 12, wherein said address register means also stores, for each of said pairs of addresses, a flag indicating a data transfer direction.

15. The system of claim 14, wherein said data transfer controller means further comprises means for generating a data memory read signal or a data memory write signal according to said Instruction Fetch signal and said flag.

16. A data transfer system, comprising:
   an address bus means, having a first part and a second part, for transferring address information;
   a data bus means, having a first part and a second part, for transferring data;
   a control bus means for transferring control signals;
   a von-Neumann-type microprocessor connected to said first part of said address bus means, said first part of said data bus means, and said control bus means;
   a program memory means, connected to said first part of said address bus means, said first part of said data bus means, and said control bus means, for storing instructions to be executed by said microprocessor;
   a data memory means, connected to said second part of said address bus means, said second part of said data bus means, and said control bus means, for storing data;
   at least one I/O device connected to said second part of said data bus means and said control bus means;
   an address bus switch means for disconnecting said first part of said address bus means from said second part of said address bus means every time said microprocessor fetches an instruction from said program memory means, and connecting said first part of said address bus means to said second part of said address bus means at other times;
   a data bus switch means for disconnecting said first part of said data bus means from said second part of said data bus means every time said microprocessor fetches an instruction from said program memory means, and connecting said first part of said data bus means to said second part of said data bus means at said other times; and
   data transfer controller means, connected to said second part of said address bus means and said control bus means, for generating addresses and control signals to perform direct transfers of data between said data memory means and said at least one I/O device via said second part of said data bus means while said microprocessor is fetching instructions from said program memory means.

* * * * *